(12) United States Patent
Forsyth

(10) Patent No.: US 6,476,396 B1  
(45) Date of Patent: Nov. 5, 2002

(54) ELECTRO-OPTICAL, NON-CONTACT MEASUREMENT OF ELECTRICAL DISCHARGES

(75) Inventor: Keith W. Forsyth, 4402 Dexter St., Philadelphia, PA (US) 19128-4823

(73) Assignee: Keith W. Forsyth, Philadelphia, PA (US)

( * ) Notice: Subject to any disclaimer, the term of this patent is extended or adjusted under 35 U.S.C. 154(b) by 0 days.

(21) Appl. No.: 09/545,419

(22) Filed: Apr. 7, 2000

Related U.S. Application Data

(60) Provisional application No. 60/128,595, filed on Apr. 9, 1999.

(51) Int. Cl.[7] .............................. G01J 1/42; G01J 3/00
(52) U.S. Cl. ...................... 250/372; 356/416; 324/536
(58) Field of Search ................... 356/311, 313, 356/417, 416; 250/372; 324/536

(56) References Cited

U.S. PATENT DOCUMENTS 5,513,002 A * 4/1996 Shapanus et al. ........... 356/313
5,598,099 A * 1/1997 Castleman et al. .......... 324/453
5,949,235 A * 9/1999 Castleman et al. .......... 239/708
6,104,297 A * 8/2000 Danilychev ................. 250/372

* cited by examiner

*Primary Examiner*—F. L. Evans
(74) *Attorney, Agent, or Firm*—Duane Morris LLP

(57) ABSTRACT

An electrical discharge measurement device for non-contact measurement of an electrical discharge having a discharge magnitude. The electrical discharge causes a corresponding emission of optical radiation. The electrical discharge measurement device has a light-collecting device for forming an image from the optical radiation from the electrical discharge, and an optical filter operatively coupled to the light-collecting device for preferentially selecting wavelengths at which the electrical discharge emits relatively intense optical radiation. An optical detector receives light from the light-collecting device and filtered by the optical filter for converting the filtered light to an electrical signal. An electronic signal-processing device provides, based on the electrical signal, a quantitative discharge measurement related to the magnitude of the electrical discharge.

17 Claims, 1 Drawing Sheet

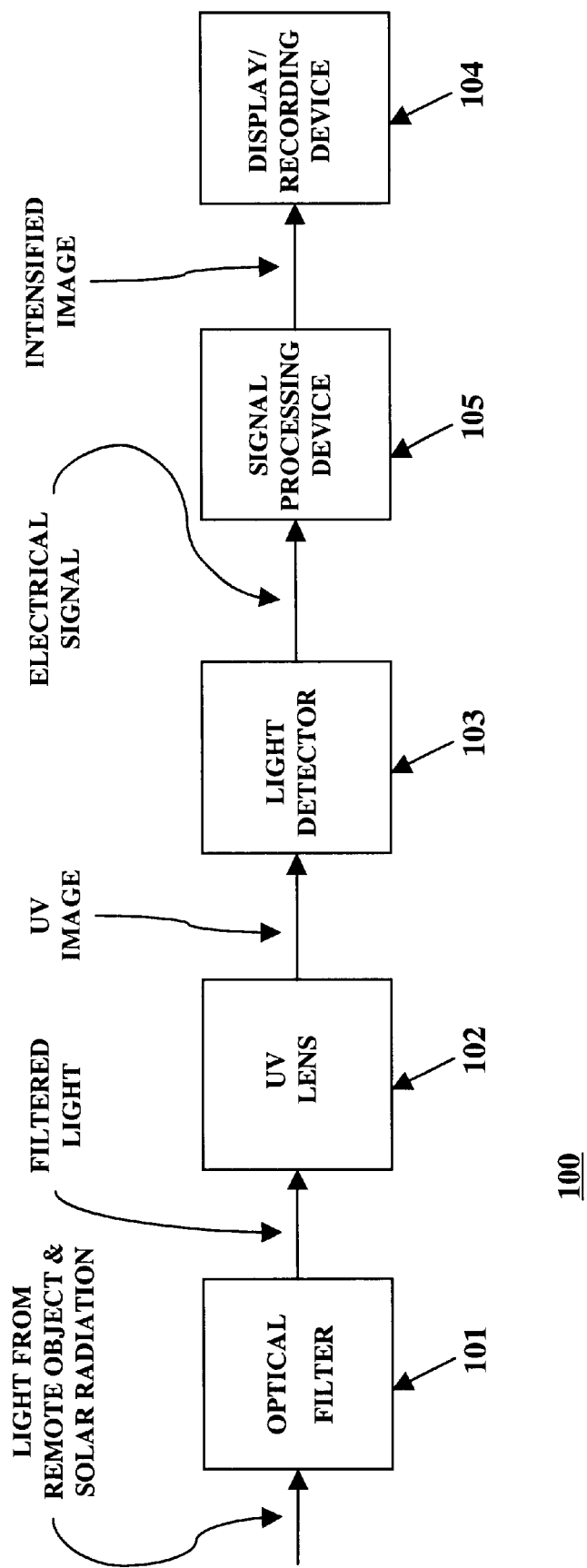
The Figure

ELECTRO-OPTICAL, NON-CONTACT MEASUREMENT OF ELECTRICAL DISCHARGES

CROSS-REFERENCES TO RELATED APPLICATIONS

This nonprovisional U.S. national application, filed under 35 U.S.C. §111(a), claims, under 37 C.F.R. §1.78(a)(3), the benefit of the filing date of provisional U.S. national application no. 60/128,595, entitled "ELECTRO-OPTICAL METHOD FOR NON-CONTACT MEASUREMENT OF ELECTRICAL DISCHARGES," filed on Apr. 9, 1999, under 35 U.S.C. §111(b), the entirety of which is incorporated herein by reference.

This application is related to co-owned U.S. Pat. No. 5,886,344, for "Corona Detector with Narrow-Band Optical Filter," inventor Keith W. Forsyth, issued Mar. 23, 1999, the entirety of which is incorporated herein by reference, and to U.S. patent application Ser. No. 09/261,532, docket no. D3530-00002, filed Mar. 3, 1999, now U.S. Pat. No. 6,150,652, the entirety of which is incorporated herein by reference; and to U.S. patent application Ser. No. 09/442,378, docket no. D3530-00004, filed Nov. 18, 1999, now U.S. Pat. No. 6,323,491, the entirety of which is incorporated herein by reference.

BACKGROUND OF THE INVENTION

1. Field of the Invention

The present invention relates to apparatuses and methods for the detection and measurement of electrical discharge.

2. Description of the Related Art

Unwanted electrical discharges through a nominally insulating medium are a commonly-occurring fault in high-voltage electrical systems. Examples of such discharges are electrical arcs in air, sulfur hexafluoride, or insulating oil. "Partial discharge" can also occur. Partial discharge refers to electrical charge flow that does not completely bridge the gap between two conducting electrodes. The current flow in a partial discharge is typically many orders of magnitude lower than the current flow in an electrical arc. Partial discharges include both "surface" partial discharges (i.e. corona) on the surface of conductors or insulators in air or other gaseous dielectrics, and "internal" partial discharges in confined spaces or voids, beneath the surface of a device, e.g. in insulating oil or gas-filled voids in solid insulation.

"Corona" or "corona discharge" denotes a type of partial discharge occurring in large, unconfined spaces such as exterior equipment surfaces. A corona discharge often occurs around high-voltage electrical apparatus when the electric field in the surrounding air exceeds the threshold for dielectric breakdown of air. When this occurs, the air surrounding the high-voltage apparatus ceases to be an insulator and becomes partially conducting. For example, apparatus such as electrical power transmission lines, transformer and substation insulators and bushings, high-voltage power supplies, and the like often have coronas associated therewith.

Although such electrical discharges are sometimes a normal and harmless feature of equipment operation, they are often a symptom or a cause (or both) of insulation system failure. In particular, a relatively small amount of electrical charge flow in such discharges may be normal and relatively harmless, whereas a comparatively large amount may be abnormal and indicative of a fault condition. Quantitative measurement of electrical discharge magnitudes can thus be used to detect faults, to aid in operating and maintaining equipment such as high-voltage electrical systems.

For example, an excessive partial-discharge magnitude can be a warning of contamination of transmission or distribution insulators and bushings, which can lead to destructive "flashover" of the insulator, or to erosion and failure in the case of polymer insulators. Excessive partial discharge may also be a symptom of failure of one segment of a "string" of ceramic suspension insulators, which places additional stress on the other segments and may evolve into total failure of the entire "string" if left uncorrected. Excessive partial discharge on the stator windings of generators and motors can also lead to destructive failure of the winding insulation.

Electronic techniques are commonly employed to quantitatively measure electrical discharge, for example in high-voltage electrical equipment. Such electronic techniques are often used to measure, for example, corona and other partial electrical discharges. Conventional electrical discharge measurement instruments measure the charge or current flow within selected time and/or frequency windows, at the point of electrical connection between a discharge-measurement instrument and the device under test (DUT). Such techniques may be used for quality assurance testing in laboratories or factories, for example, and can measure both discharges occurring within insulation (partial discharge) and discharges occurring on the outside surface of conductors or insulators (corona, a specific type of partial discharge). The most common such electronic technique is termed partial-discharge testing, and is described in detail in IEC Standard 270 (Partial Discharge Measurements) and in IEEE Draft Standard P1434 (Measurement of Partial Discharges in Rotating Machinery).

Unfortunately, these conventional electronic discharge measurement techniques and devices suffer from certain disadvantages. First, their measurement sensitivity depends upon the location of the discharge and the capacitance of the equipment, and thus may be very low for equipment of large size. Second, since physical connection is required between the device under test and the measuring instrument, the equipment must be disconnected from service in order to allow these connections to be made. This can be inconvenient or impossible if the equipment is part of an operating power grid, and may also be time-consuming and expensive. Third, conventional electronic discharge measurement techniques have difficulty in discriminating between actual partial discharges and ambient electronic noise, particularly when measurements are made outside of a test laboratory or on operating equipment; false or ambiguous readings are therefore not uncommon. Fourth, the electronic method generally cannot provide any information about the location of the discharge (as opposed to its magnitude); this location information would greatly facilitate analysis and repair of the defects associated with excessive discharge. Improved discharge-measurement devices and methods which do not suffer the above-mentioned drawbacks are therefore needed.

SUMMARY

An electrical discharge measurement device for non-contact measurement of an electrical discharge having a discharge magnitude. The electrical discharge causes a corresponding emission of optical radiation. The electrical discharge measurement device has a light-collecting device for forming an image from the optical radiation from the electrical discharge, and an optical filter operatively coupled to the light-collecting device for preferentially selecting wavelengths at which the electrical discharge emits relatively intense optical radiation. An optical detector receives light from the light-collecting device and filtered by the optical filter for converting the filtered light to an electrical signal. An electronic signal-processing device provides, based on the electrical signal, a quantitative discharge measurement related to the magnitude of the electrical discharge.

BRIEF DESCRIPTION OF THE DRAWINGS

These and other features, aspects, and advantages of the present invention will become more fully apparent from the following description, appended claims, and accompanying drawings in which:

The FIGURE is a block diagram of an electro-optical, non-contact electrical discharge detector, in accordance with an embodiment of the present invention.

DESCRIPTION OF THE PREFERRED EMBODIMENT

The present invention provides an electrical discharge-measurement method which does not require physical contact with the DUT, and which further provides location information, and which is also not subject to ambient electronic noise. In particular, the present invention is an electro-optical discharge detector and measurement device, which relies upon the detection of the optical energy emitted by the discharge to be measured. The present invention exploits the fact that many electrical discharges of practical interest emit optical energy primarily in certain narrow lines or bands, and that the specific optical wavelength(s) of such optical emission is characteristic of the dielectric through which the discharge current flows. Thus, by means of a combination of optical filtering to preferentially select these characteristic emissions, and electronic signal processing to preferentially select the time and/or frequency properties characteristic of the charge flow in the electrical discharges to be measured, a practical optical technique for discharge magnitude measurement may be provided. The discharge detector of the present invention requires no physical contact with the DUT, is portable, provides precise information on the location of the discharge, is immune to ambient electrical noise, and provides a measurement sensitivity that is independent of the size or other characteristics of the DUT, as described in further detail below.

In the present application, "measurement" refers to determining a quantity that is related to the electrical discharge magnitude in some useful manner. For example, the measured quantity may be proportional or otherwise related to the average discharge current, the peak discharge current, or the number of discharge pulses within a given time period. The quantity measured need not be a direct measurement of the discharge current, although the approximate discharge current may be determined from such quantitative measurement through calibration procedures. The measurement results may be in arbitrary units, which are still useful in comparing relative discharge magnitudes and in comparing such results to empirically-selected thresholds.

Referring now to the FIGURE, there is shown a block diagram of an electro-optical, non-contact electrical discharge measurement device or system 100, in accordance with an embodiment of the present invention. Discharge measurement device or instrument 100 of the present invention, in one embodiment, comprises five basic elements: light-collecting device such as image-forming lens 102; optical filter 101; light image detecting device (optical detector) 103, which converts light energy into electrical energy; an electronic signal processing device 105 that converts the electrical signal from the detector 103 into a measure of discharge magnitude; and an output or display/recording device 104. The component parts of discharge measurement device 100 are preferably assembled into external housing (not shown) to form a single discharge measurement device unit or instrument, and such that the correct mechanical spacings are maintained. This unit may be held in the hands, or mounted on a tripod or other rigid support, and pointed toward the area of the apparatus to be inspected. Typically, this area will be located 3 to 50 meters away from the discharge measurement device 100 and its user.

The five components of discharge measurement device 100, and the device's method of operation and use, are described in further detail below.

Lens 102 is preferably a lens, reflective telescope, non-imaging optical concentrator, or other light-collecting optical device having a well-defined field of view. Thus, hereafter, the term "lens" is used to refer to any light-collecting optical device with a well-defined field of view. The lens is preferably constructed so as to pass the desired wavelengths of ultraviolet (UV), visible, or near-infrared light with high efficiency. (These wavelengths are set forth specifically below with reference to optical filter 101.) The effective focal length of the lens is selected to give the desired field of view in conjunction with the active area of the specific optical detector employed, in accordance with standard optical engineering techniques.

In one embodiment, in the case of measurement of corona discharge in air, lens 102 consists of two plano-convex lens elements. In an embodiment, the lens need not have the same degree of spatial resolution as the lens of a typical imaging system, as a point spread radius equal to 1%–10% of the detector radius will be sufficient.

In one embodiment, the light-collecting device or lens 102 is at the distal (front) end of an optical fiber (or fiber bundle) (not shown), and the optical detector 103 is at the other (proximal) end of the same fiber. In an embodiment, lens 102 is a separate lens at the distal end of the optical fiber. In an alternative embodiment, the open end of the fiber or fiber bundle itself is the light collecting device 102. Thus, in this embodiment, the optical fiber or fiber bundle is interposed between the light collector element 102 (or includes it), and optical detector 103.

In general, the optical filter 101 may be placed at any suitable position in the optical path before optical detector 103. For example, optical filter 101 may be mounted to the front of optical detector 103, in which case the proximal end of the fiber would be run to the optical input of the optical filter, for example. As will be appreciated by those skilled in the art, the position of the filter 101 with respect to lens 102 and/or the fiber and optical detector 103 is dictated by engineering considerations such as the angular spread of the beam entering and exiting the fiber, the size and angular aperture of the detector, and similar engineering considerations and design choices. Normally, the proximal (end light exits from) end of the fiber and the detector 103 would be separated by a few cm, and the filter 101 interposed between the two. In some cases, additional optics would also be present in the space between the fiber and the detector 103 (coupling lenses for numerical aperture matching, and the like).

As will be appreciated, employing an optical fiber or bundle in this manner allows discharge measurement in enclosed or confined spaces and other locations not otherwise accessible. For example, this permits an optical reading to be taken from an area where it is difficult or impossible to insert the entire instrument. The optical fiber distal end portion may be inserted into smaller spaces, without having to insert the entire device or instrument 100. For example, such an embodiment may be used to scan the individual slots and winding segments of a small motor stator, where the inner diameter of the stator is a cylinder of the order of 10 to 20 cm and the entire instrument 100 will fit, nor is there a good line-of-sight view from the exterior of the stator to all the points to be scanned. Even if the instrument could be inserted inside the stator, it may be undesirable to locate the instrument so close to a conductor energized at high voltage, whereas an all-dielectric fiber bundle could safely be placed near the conductor.

Such an embodiment could also be used to measure discharge from the slots or end turns of an operating electrical generator or motor, where the enclosed housing provides no line-of-sight path at all. A small-diameter dielectric fiber could be passed through the housing of the machine without interfering with the operation of the device and without pickup of electromagnetic noise and interference. The fiber embodiment of the present invention could also be used in other situations where an enclosure or other confined space makes the use of a fiber-optic input preferable to line-of-sight collection of optical radiation by a lens.

Optical filter 101 is preferably an optical filter that passes a relatively narrow range or band of optical wavelengths selected from the total light energy collected by lens 102, and that rejects a large fraction of the interfering ambient light present in the measurement environment. The purpose of this filter is to selectively pass characteristic light wavelengths that are emitted by the discharge to be measured, and to reject interfering background light coming from sources other than the electrical discharge being measured, so as to maximize the ratio (at the optical detector 103) of light emitted by the discharge to light emitted by other sources within the optical field of view.

The center wavelength and bandwidth of filter 101 is chosen so as to pass one or more specific wavelengths that are characteristic of the light emission from electrical discharges within the dielectric of interest. For center wavelengths greater than 290 nanometers (nm), filter bandwidths of approximately 10 nm or less are generally preferred. For filters centered in this range (i.e., center wavelength greater than 290 nm), narrower bandwidths typically give better performance but are more difficult and expensive to produce. For center wavelengths less than 290 nm, filter bandwidths of approximately 10 to 50 nm are generally preferred. For filters centered in this range (i.e., center wavelength less than 290 nm), optimum performance depends more upon a high degree of out-of-band blocking than upon the filter bandwidth.

Specifically, the light emissions to be selectively passed by filter 101 in one embodiment are as follows.

(1) In the case of electrical discharges in air or nitrogen, the characteristic light wavelengths are preferably one or more of the spectral lines conventionally designated as belonging to the "second positive" or "fourth positive" series of emission lines of neutral molecular nitrogen, or to the "gamma" series of emission lines of nitrous oxide. (These identifications are common terms of art used in optical physics and spectroscopy.) The specific line or lines chosen will depend upon the specific circumstances, and most particularly on the nature and intensity of background light present. For example, for measurements made indoors, or outdoors in darkness, the (0,0) line of the nitrogen second positive series, located at approximately 337 nm, is generally preferred. Other useful emissions from the nitrogen second-positive series occur at wavelengths approximately equal to 296, 315, 357, 377, 400, 405, and 436 nm. For measurements made outdoors in daylight, the (4,2), (3,1), and (2,0) lines of the nitrogen second positive series, located between 295.3 and 297.7 nm, may be preferred. For the greatest possible immunity to background light during daylight operation, the nitrogen fourth positive emission lines, located between 225.6 and 290.4 nm, and/or the nitrous oxide gamma bands, located between 200 and 240 nm, are generally preferred. In this case, the best choice may be a single filter of bandwidth approximately 30 to 50 nm, passing a multiplicity of emission lines having wavelengths shorter than 290 nm.

(2) In the case of electrical discharges within hydrogen gas, insulating hydrocarbon or silicone oil, or hydrogen-containing solid polymer dielectrics, or for detecting surface tracking across solid polymer insulation, the preferred characteristic wavelengths would normally be the "alpha" emission line of atomic hydrogen located at approximately 656.3 nm (i.e. the first line of the Hydrogen Balmer series). Under some circumstances, other hydrogen emission lines of the Balmer or Paschen series may also be used. In an embodiment, therefore, the electrical discharge to be detected is a surface or sub-surface discharge on or within hydrocarbon materials such as insulating mineral oils or epoxy, and the optical filter 101 is of bandpass construction and preferentially selects the alpha or beta emission lines of atomic hydrogen, or both.

(3) Discharges win other gaseous, liquid, or solid dielectrics (such as sulfur hexafluoride or insulating mineral oil or silicone oil) may have other characteristic emission lines which filter 101 is preferably selected to pass. In general, optical filter 101 is chosen to substantially pass an emission line, group of lines, or band that is characteristic of discharges within the dielectric of interest, while at the same time substantially rejecting the great majority of the interfering ambient light (the emission lines of greater relative intensity being preferred).

Optical detector 103 is preferably an optical detector that converts the filtered light transmitted by optical filter 101 into an electrical signal, with useful efficiency and sufficiently low noise. The preferred optical detector for most applications is a photomultiplier tube (PMT) having a photocathode material having a relatively large sensitivity at the desired wavelengths and minimum possible sensitivity at other wavelengths; in some cases a semiconductor photodiode or avalanche photodiode may be the preferred detector if sufficient optical signal is present and cost is a major concern. In general, the use of a photomultiplier is preferred. The preferred type of photomultiplier employs a metal rather than glass envelope for ruggedness, but a glass-envelope PMT may also be used. In cases where the emission to be detected falls within the ultraviolet portion of the spectrum, the preferred photocathode material in the PMT is bialkalai, although a working device may be constructed from multi-alkalai or other cathodes. In any case, an appropriate type of PMT and photocathode can be selected by one skilled in the art of optical engineering.

In the case of very strong interfering ambient background light, as outdoors in daylight, the preferred photocathode may be of the "solar-blind" type constructed of cesium telluride, rubidium telluride, or their alloys.

Signal processing unit (discharge magnitude detector) 105 is a signal processing device that processes the electrical output signal from optical detector 103 in order to separate the electronic signal due to the discharge being measured from electronic noise and from the electronic signal due to any interfering ambient background light that passes through optical filter 101 and reaches optical detector 103. Following separation of the signal of interest, the signal processing device quantifies this signal in some manner, and passes this quantity to output or display device 104.

The specific features of signal processing device 105 are determined by the nature of the discharge being measured, and by the nature and magnitude of the predominant interfering signals and noise, and thus will vary with the specific application. Various methods to perform this signal processing function are described below, although other suitable signal processing functions may be utilized by one skilled in the art of electronic signal processing.

Two broad classes of signal processing methods are preferably employed in the present invention, either alone or in combination with each other: (1) phase- or frequency-coherent processing in the case of discharges from AC electric power systems; and (2) pulse-height analysis in the case of both AC and DC electric power systems.

Phase- or frequency-coherent processing in this general sense includes a variety of implementations of the matched filter concept ("matched filter" being a term of art in the field of electronic signal processing). As will be appreciated, a matched filter is one that is matched, in either its time or frequency properties, to the signal of interest to be detected. In particular, an ideal matched filter is a filter with an impulse response that is a time-reversed replica of the signal to be detected by the matched filter; a mathematically identical definition is a filter with a frequency response that is the complex conjugate of the frequency spectrum of the signal to be detected. Many if not most matched filters are in practice approximations to the ideal matched filter, i.e. may therefore not exactly conform to the definition provided above for an ideal matched filter.

The use of phase-coherent signal processing methods relies upon the fact that discharges occurring in AC power systems are phase-coherent with the AC electric power flowing in the equipment to be tested. In contrast, neither electronic noise nor interfering signals due to ambient sunlight will be in any way phase-coherent with the discharge signal to be measured. Thus, by performing signal processing with device 105 taking these electrical discharge charge flow time and/or frequency characteristics into account, further separation of the discharge-signature signal from background or unrelated signals or noise may be made, to further enhance the accuracy of the discharge magnitude measurement displayed on display device 104.

Thus, the electronic signal processing device of the present invention comprises an approximation to a matched filter, as typically employed in radar signal processing, and which is matched to the typical intensity variation with time of the optical emission of corona discharge. This optical emission typically consists of pulses with duration of the order of 10 ns, occurring in bursts of varying number near the positive or negative peaks (or both) of the electrical power line frequency.

Pulse-height analysis includes preferential selection of signal components consisting of short-duration pulses, and the analysis of such pulses based upon their amplitude spectrum and, in some cases, their relative time of arrival. ("Pulse height analysis" is a term of art that will be familiar to those skilled in the art of electronic signal processing.) The use of pulse-height signal processing relies upon the fact that most corona discharges of practical interest consist of short current impulses (of typical duration less than one hundred nanoseconds (ns)), which also emit optical energy in short pulses of approximately the same duration, and upon the fact that the duration and pulse height spectrum of these pulses are distinct from the duration and pulse height spectrum of pulses due to electronic noise and interference within the measurement instrument and its environment. In contrast, interfering signals from ambient light will typically be of a nearly constant magnitude, and electronic noise will typically consist of white or colored noise. For some applications, even a one-bit pulse-height analysis may be of practical use, if the comparator threshold of the analog-to-digital converter is set to at least three to five times the RMS value of the random electronic noise at the analog-to-digital conversion device. Therefore, in an embodiment, electronic signal processing device 105 comprises a pulse-height discriminator (i.e., pulse-height analyzer) for sorting electrical signal pulses into one or more bins associated with discharge pulses to be measured and one or more bins associated with electronic noise pulses. To be useful, such pulse-height discriminator may have as few as two bins (one bit), of which only the bin associated with discharge pulse count need be reported or displayed. A pulse-height discriminator employing more than two bins (more than one bit) may also be used.

In one embodiment, in the case of arc discharge in 50 or 60 Hz AC power systems, the optical emission from the discharge has a strong amplitude modulation component at either 100 or 120 Hz (i.e., twice the power frequency), and the optical emission is also phase-synchronous with the power frequency. By using in signal processing device 105 a narrow-band electronic bandpass filter tuned to 100 or 120 Hz, or a phase-locked-loop (PLL) combined with a magnitude-responding phase-sensitive detector (PSD) designed to respond to 100 or 120 Hz, the arc signal may be reliably separated from the constant-magnitude (DC) signal arising from sunlight, and from the broadband electrical noise of the detector and other circuitry. In an embodiment, electronic signal processing device 105 comprises a phase-sensitive detector constructed from a linear or switching mixer and deriving its reference signal directly or indirectly from the fundamental electric power frequency or its low-order harmonics.

As will be appreciated, these filters or PLL/PSD circuits may be entirely analog, or analog/digital combinations. After the arc-discharge signal has been so separated, the signal magnitude may be measured by a conventional RMS-to-DC conversion circuit.

Thus, in an embodiment, signal processing device 105 is a narrow-band electronic filter of bandpass construction which passes either the fundamental electric power frequency (i.e., 60 Hz in North America, 50 Hz in Europe), the second harmonic of the fundamental electric power frequency (i.e., 120 Hz in North America, 100 Hz in Europe), or a combination of the two. In an alternative embodiment, signal processing device 105 comprises a narrow-band electronic comb filter which passes three or more of the harmonics of the fundamental electric power frequency. For example, in the case of the 60 Hz fundamental power frequency used in North America, these harmonics might be the second, third, and forth (i.e., 120, 180, & 240 Hz).

In another embodiment, in the case of corona discharges on 50 or 60 Hz AC power system components, the magnitude of the positive-polarity discharges will be much larger than the negative-polarity discharges, and the negative-polarity corona will usually be of no practical significance.

Further, this positive discharge will consist of impulses of duration less than one microsecond (μs), occurring in bursts of impulses near the positive peaks of the power waveform, again being phase-synchronous with the electrical power waveform. Thus the amplitude spectrum of the discharge signal will consist of narrow bands located at 50 or 60 Hz and all even and odd harmonics of 50 or 60 Hz, extending to frequencies in excess of 10 megahertz. In contrast, the electronic noise will be distributed approximately uniformly in time and frequency, and the amplitude spectrum of the ambient sunlight will be concentrated at zero frequency. In this case, the signal processing may consist of a PLL/PSD combination, designed to lock to the 50 or 60 Hz power frequency, but having a square-wave (i.e. harmonic) rather than sine-wave transfer function.

In another embodiment, in the case of corona and other partial discharges in which the discharge typically takes the form of short-duration impulses (i.e. less than one μs per impulse), and in the case of discharges from DC power systems, non-linear signal processing employing a form of pulse-height analysis (PHA) may be the preferred signal processing method. In such an embodiment, the electronic output of optical detector 103 is input to one or more comparators of signal processing device 105, each with fixed comparison threshold; the pulses from each comparator output are counted separately, by appropriate pulse forming and counting circuitry of device 105, to produce a pulse height spectrum. This spectrum will in general be bi-modal, with one mode (due to noise pulses) corresponding to the lowest threshold value, and a second mode (due to corona signal pulses) located at some higher threshold. Conventional spectral deconvolution may be used to separate these two modes, and quantify the mode associated with the corona signal. Finally, the number of corona pulses per measurement interval (i.e., one cycle of the power frequency, one second, or some other convenient interval) may be displayed on output display device 104, as this number is related to the discharge magnitude.

The capability of this pulse-height-analysis method to discriminate between corona impulses and noise may be further enhanced by designing the pulse forming and counting circuit following the comparators to count only pulses of duration less than some minimum time (e.g. 100 ns or 1 μs); this can be implemented by the use of conventional monostable multivibrator circuitry or other conventional electronic methods.

In another embodiment, in the case of discharges from AC power systems, and to achieve improved immunity to noise and interfering signals, pulse-height analysis and phase- or frequency-synchronous detection methods may be combined such that noise pulses distributed randomly in time are averaged to zero but signal pulses due to discharges coherent with the power line frequency are coherently added. This may be implemented in a variety of ways that will be apparent to one skilled in the art of electronic signal processing.

In one such implementation, short-duration pulses recovered from the signal received from optical detector 103 are counted during a time sample, and the pulse count from sequential time samples are input to a digital filter of signal processing device 105 which has its delay tap duration selected to be an integer divisor of the AC power period. (In the case of 50 Hz systems, the period is 20 milliseconds, and in the case of 60 Hz systems, the period is 16-⅔ milliseconds.) The taps and weighting functions of this digital filter are so arranged that pulses occurring within time samples separated by one power-line period are added to the filter output, whereas pulses occurring within time samples separated by less than one but more than one-fourth of one power line period are subtracted from the filter output. If the weighting functions are adjusted to give an average output count of zero in the presence of stationary noise, the output of this digital filter will be proportional to the number of discharge impulses received.

Thus, in an embodiment, the electronic signal-processing device 105 comprises a coherent pulse-height discriminator (i.e., pulse-height analyzer) for sorting electrical signal pulses into one or more bins associated with discharge pulses to be measured and one or more bins associated with electronic noise pulses. The coherent pulse height discriminator assigns electrical pulses to bins associated with the discharge to be measured or bins associated with electronic noise based on the delay between pulse arrival time, such that electrical pulses correlated with the electric power frequency are assigned to the discharge pulse bin(s) and electrical pulses that are uncorrelated with the electric power frequency are assigned to the noise pulse bin(s). This coherent pulse-height discrimination may be performed using finite-impulse-response multiplier-accumulator hardware, by analog-to-digital conversion and computer software processing, or by any other suitable means.

It should be noted that a PLL is not necessary for frequency-coherent methods to be used in the present invention. Because of the very high stability of the AC power line frequency, a clock located within the measurement instrument may be constructed so as to generate the necessary reference signal to allow phase-coherent processing.

Output or display device 104 is a conventional output device, such as a serial or parallel port for transmission of data to a computer, and LED or LCD display for directly displaying the measurement results, or similar device. The measurement result is a one-dimensional cardinal number in some type of unit, representative of or related to the magnitude of the electrical discharge occurring within the field of view. Thus, for example, the discharge measurement device 100 may be aimed at a portion of a DUT, to measure the electrical discharge magnitude at that portion. This magnitude may be automatically or manually compared to a threshold magnitude, which may itself be selected by empirical calibration to correspond to a dangerous or possibly problematic discharge magnitude. Multiple thresholds may also be employed. Alarms or warning lights or signals may be automatically generated by device 100 when thresholds are exceeded. The device field of view may be swept across a DUT to find the peak discharge measurement, so as to identify the source or location of any electrical discharge.

Therefore, the present invention provides a device for measurement of electrical discharge magnitudes by means of measuring the optical emission from the discharge. In an embodiment, the discharge measurement device of the present invention comprises five main components: a lens or light-collecting device 102 that collects the optical emission from an electrical discharge occurring within a defined field of view; an optical filter 101 that preferentially passes the optical emission characteristic of the discharge and rejects a large portion of the interfering ambient light; an optical detector 103 that converts this filtered optical energy into electrical energy with high sensitivity and low noise; an electronic signal processing device 105 that converts the electrical signal from the detector into a cardinal measure of discharge magnitude and that generally employs phase- or frequency-coherent processing and/or pulse-height analysis to preferentially select the time and/or frequency properties characteristic of the charge flow in the electrical discharges to be measured; and an output or display device 104 for conveying the one-dimensional cardinal measurement result to a human operator, recording device, or computer, etc.

It will be understood that various changes in the details, materials, and arrangements of the parts which have been described and illustrated above in order to explain the nature of this invention may be made those skilled in the art without departing from the principle and scope of the invention as recited in the following claims.

What is claimed is:

1. An apparatus for non-contact measurement of an electrical discharge having a discharge magnitude, the electrical discharge causing a corresponding emission of optical radiation, the apparatus comprising:

(a) a light-collecting device for forming an image from the optical radiation from the electrical discharge;

(b) an optical filter operatively coupled to the light-collecting device for preferentially selecting wavelengths at which the electrical discharge emits relatively intense optical radiation;

(c) an optical detector for receiving light from the light-collecting device and filtered by the optical filter for converting the filtered light to an electrical signal; and (d) an electronic signal-processing device for providing, based on the electrical signal, a quantitative discharge measurement related to the magnitude of the electrical discharge.

2. The apparatus of claim 1, wherein the light-collecting device is positioned in front of the optical filter so that the optical filter receives the image from the light-collecting device.

3. The apparatus of claim 1, wherein the light-collecting device is a lens.

4. The apparatus of claim 1, wherein the electrical discharge is a surface partial discharge.

5. The apparatus of claim 1, wherein the light-collecting device is a non-imaging concentrator.

6. The apparatus of claim 1, further comprising a fiber-optic cable which comprises the light-collecting device.

7. The apparatus of claim 1, wherein the optical filter is a narrow-band optical filter of bandpass construction passing one or more of the relatively intense spectral lines associated with the second positive molecular spectrum of nitrogen.

8. The apparatus of claim 1, wherein the optical filter comprises one of a bandpass and a short-pass optical filter which passes one or more of the relatively intense spectral lines associated with corona discharge at wavelengths between 200 and 280 nm, and which substantially rejects radiation at wavelengths longer than approximately 300 nm.

9. The apparatus of claim 8, wherein the optical detector is of the solar-blind type and comprises a photomultiplier having one of a cesium telluride, rubidium telluride, and cesium-rubidium telluride photocathode.

10. The apparatus of claim 1, wherein the electronic signal-processing device comprises a matched filter which is matched to the typical intensity variation of the optical radiation from a surface partial discharge.

11. The apparatus of claim 1, wherein the electronic signal-processing device comprises a narrow-band bandpass electronic filter which passes at least one of a fundamental electric power frequency and a second harmonic of said fundamental electric power frequency.

12. The apparatus of claim 1, wherein the electronic signal-processing device comprises a narrow-band electronic comb filter which passes at least three or more harmonics of a fundamental electric power frequency.

13. The apparatus of claim 1, wherein the electronic signal-processing device comprises a phase-sensitive detector that derives a reference signal from one of a fundamental electric power frequency and its low-order harmonics.

14. The apparatus of claim 1, wherein the electronic signal-processing device comprises a pulse-height discriminator for sorting electrical signal pulses into one or more bins associated with discharge pulses and one or more bins associated with electronic noise pulses.

15. The apparatus of claim 1, wherein the electronic signal-processing device comprises a coherent pulse-height discriminator for sorting electrical signal pulses into one or more bins associated with discharge pulses and one or more bins associated with electronic noise pulses by assigning electrical pulses to either the discharge pulse bins or the electronic noise pulse bins based on whether the electrical pulses are correlated with an electric power frequency as indicated by the delay between pulse arrival time.

16. The apparatus of claim 1, wherein said electrical discharge is a surface or sub-surface discharge on or within a hydrocarbon materials, wherein the optical filter comprises a bandpass filter that preferentially selects at least one of the alpha and beta emission lines of atomic hydrogen.

17. The apparatus of claim 1, wherein the electrical discharge is associated with a portion of a remote high-voltage electrical device and the field of view includes the portion of remote device.

* * * * *